United States Patent
Chang (10) Patent No.: US 7,422,469 B1
(45) Date of Patent: Sep. 9, 2008

(54) AUDIO PLUG AND METHOD OF MAKING THEREOF

(76) Inventor: Ching-Wen Chang, No. 22, 23rd Road, Taichung Industrial Park, Nan Tun District, Taichung 40850 (TW)

( * ) Notice: Subject to any disclaimer, the term of this patent is extended or adjusted under 35 U.S.C. 154(b) by 0 days.

(21) Appl. No.: 11/952,178

(22) Filed: Dec. 7, 2007

(51) Int. Cl.
*H01R 13/58* (2006.01)

(52) U.S. Cl. ...................................... 439/449

(58) Field of Classification Search ............... 439/449, 439/668, 669, 578, 463; 385/139
See application file for complete search history.

(56) References Cited

U.S. PATENT DOCUMENTS

| | | | | |
|---|---|---|---|---|
| 5,139,444 A * | 8/1992 | Garay et al. | ................. | 439/668 |
| 5,277,628 A * | 1/1994 | Lin et al. | ..................... | 439/668 |
| 6,069,960 A * | 5/2000 | Mizukami et al. | ............. | 381/74 |
| 6,394,852 B1 * | 5/2002 | Huang | ......................... | 439/669 |
| 6,461,199 B1 * | 10/2002 | Koga et al. | ................... | 439/668 |
| 6,672,894 B2 * | 1/2004 | Sprunger | ..................... | 439/449 |
| 6,718,113 B2 * | 4/2004 | Mine et al. | ................... | 385/139 |
| 2004/0137782 A1 * | 7/2004 | Weingartner | ................ | 439/404 |

* cited by examiner

*Primary Examiner*—Chandrika Prasad
(74) *Attorney, Agent, or Firm*—Morris Manning & Martin LLP; Tim Tingkang Xia, Esq

(57) ABSTRACT

An audio plug and the method of making thereof are disclosed. The audio plug includes a terminal connected to a cord, a first molding formed between the terminal and the cord, a second molding formed on the first molding, a ring disposed on the second molding, and a strain relief collar mounted on the second molding. The method of making the audio plug includes providing a cord to insert through a ring and a strain relief collar, so as to connect a terminal; forming a first molding between the terminal and the cord using an injection molding process; forming a second molding on an external peripheral surface of the first molding using an injection molding process; and fixing the ring and the strain relief collar onto the external peripheral surface of the second molding.

13 Claims, 11 Drawing Sheets providing a cord which inserts through a ring, a strain relief collar and there after connects to a terminal forming a first molding on a connection between the terminal and the cord forming a second molding on the first molding fixing the ring and the strain relief collar to the second molding

AUDIO PLUG AND METHOD OF MAKING THEREOF

BACKGROUND OF THE INVENTION

1. Field of the Invention

The present invention relates to an audio plug and a method of making the same.

2. Description of the Related Art

Figure 11:
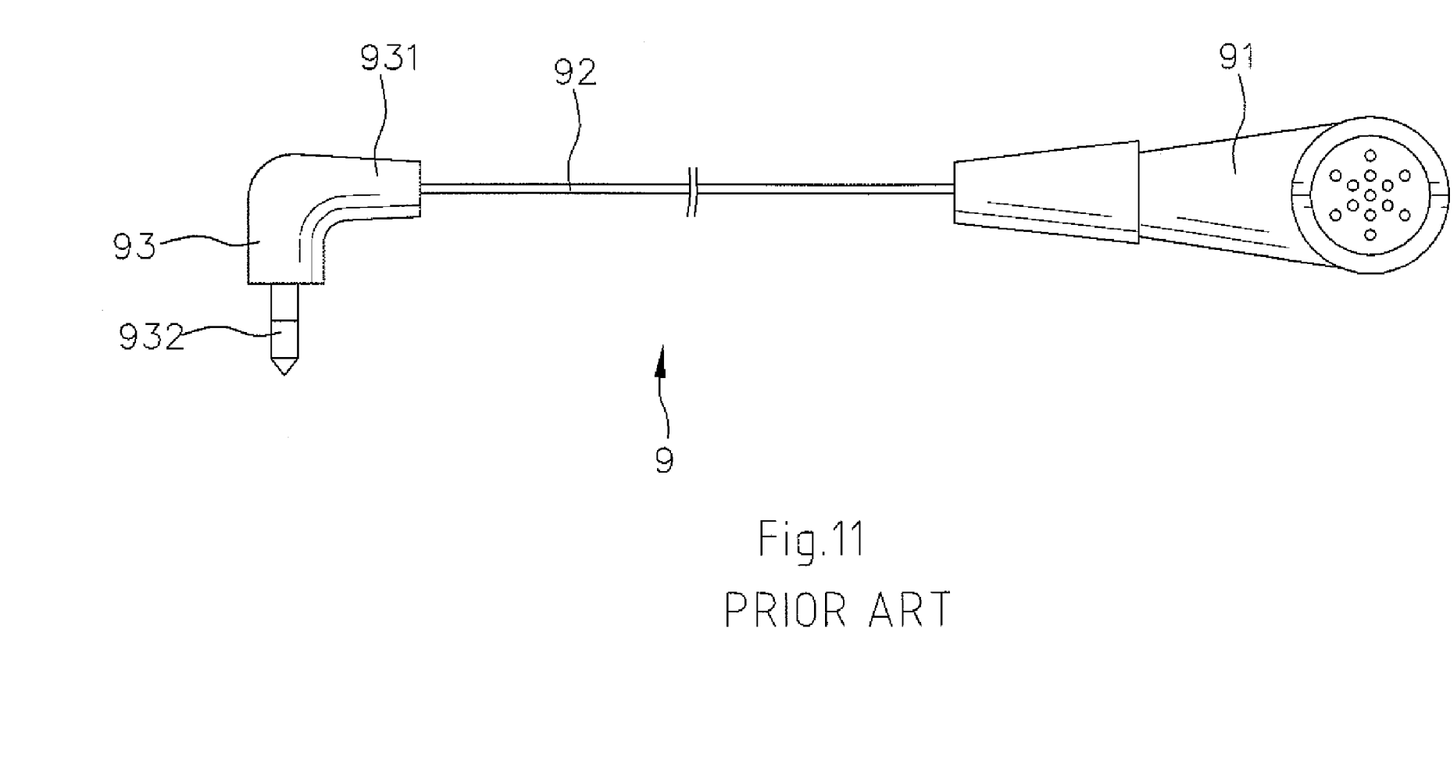
FIG. 11 shows a conventional plug incorporating in an earphone assembly.

Referring to FIG. 11, a known earphone assembly 9 includes an earphone 91 adapted to be engaged with an ear, a plug 93 having a terminal 932 adapted to be connected to a sound source, and a cord 92 connected therebetween. A plastic housing 931 is provided to enclose a connection between the cord 92 and the terminal 932.

A problem associated with such plug 93 is that the cord 92 can not be securely connected to the terminal 932 and the plastic housing 931 is unable to effectively prevent disconnection therebetween. Furthermore, the plastic housing 931 is not aesthetically pleasing.

The present invention is, therefore, intended to obviate or at least alleviate the problems encountered in the prior art.

SUMMARY OF THE INVENTION

It is therefore an object of the present invention to provide an audio plug which securely attaches to a cord and methods of making the same.

It is another object of the present invention to provide an audio plug that is aesthetically pleasing.

It is yet another object of the present invention to provide an audio plug that passes an electrostatic discharge (ESD) test.

Accordingly, the present invention discloses an audio plug comprising a terminal connected to a cord. A first molding is circumferentially formed between the terminal and the cord. A second molding is formed on the first molding peripherally. A ring is disposed on the second molding peripherally. A strain relief collar is circumferentially mounted on the second molding and enables the cord to be inserted therein, and abutted with the ring.

As to the method for making an audio plug in accordance with the present invention. The method comprises providing a cord to insert through a ring and a strain relief collar, so as to connect a terminal; forming a first molding between the terminal and the cord using an injection molding process; forming a second molding on an external peripheral surface of the first molding using an injection molding process; and fixing the ring and the strain relief collar onto an external peripheral surface of the second molding.

Other objectives, advantages, and novel features of the invention will become more apparent from the following detailed description when taken in conjunction with the accompanying drawings.

BRIEF DESCRIPTION OF THE DRAWINGS

The aforementioned objects and advantages of the present invention will be more fully understood hereinafter as a result of a detailed description of preferred embodiments thereof when taken in conjunction with the following drawings in which.

DETAILED DESCRIPTION OF THE PREFERRED EMBODIMENT

Figure 2:
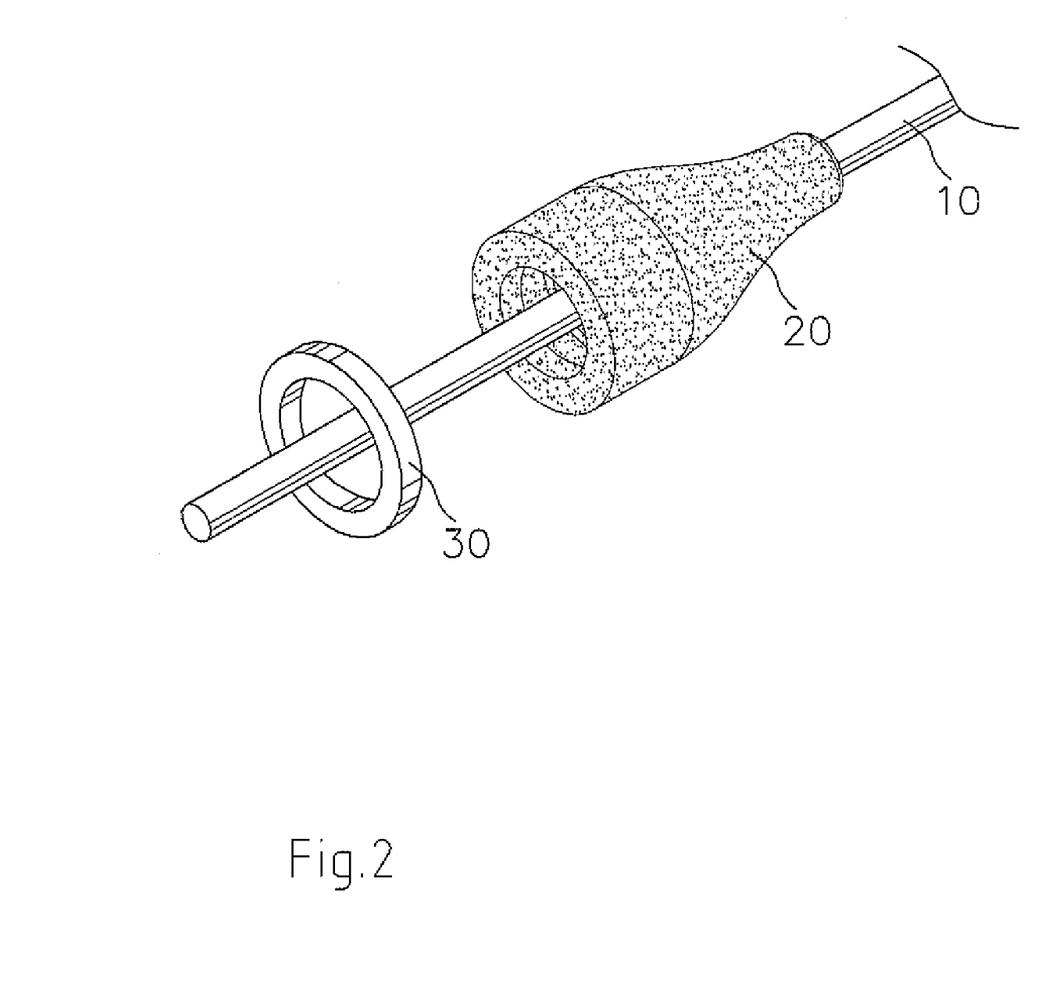
FIGS. 2 and 3 illustrate the first step of making the audio plug of the present invention.
Figure 3:
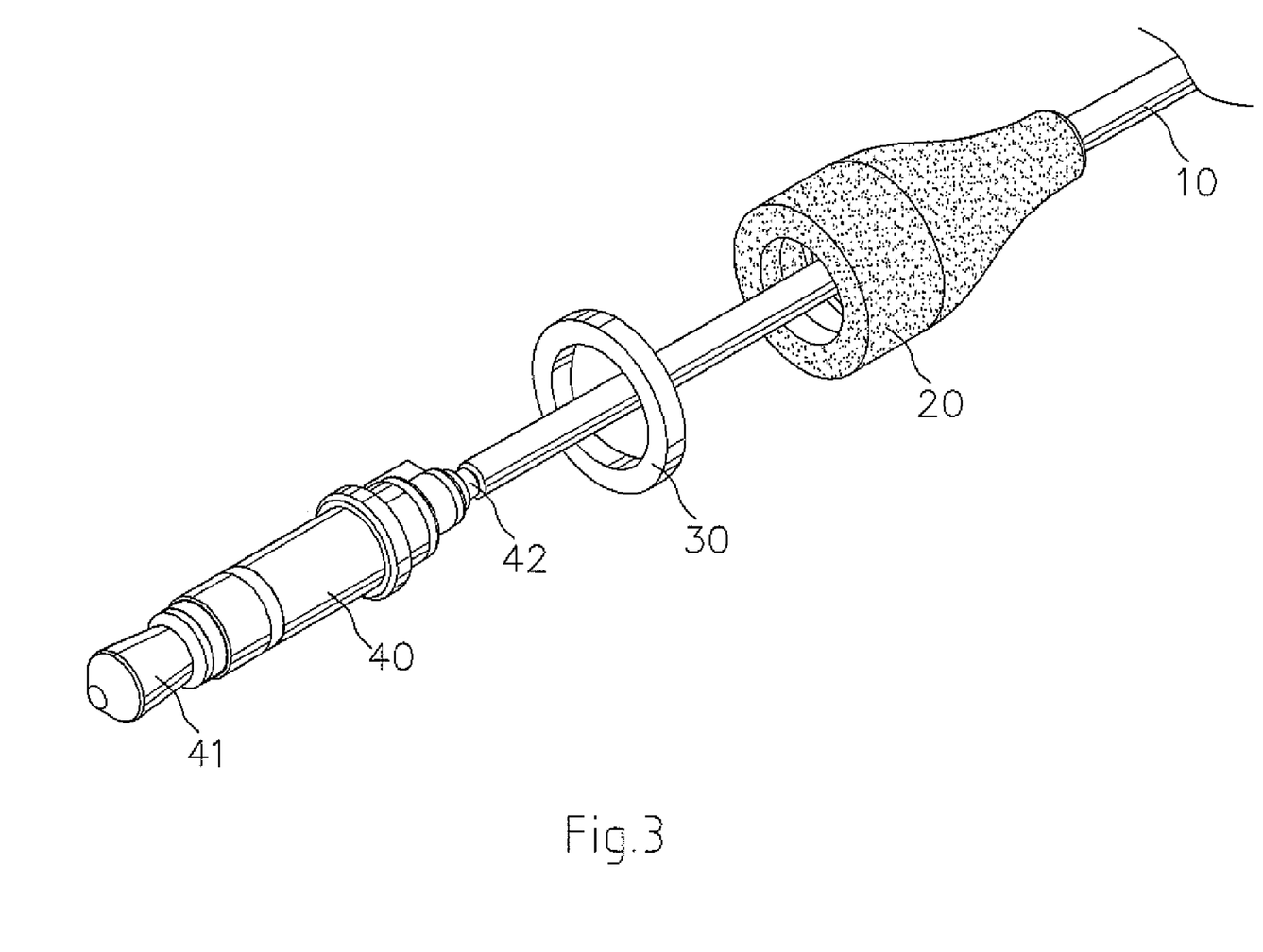

Referring to FIGS. 2 and 3, an audio plug 1 in accordance with the present invention comprises a terminal 40, and a cord 10 inserted into a strain relief collar 20 and a ring 30 successively. Preferably, the ring 30 is made of metal.

The terminal 40 includes a first end 41 adapted to connect to an electrical product. The terminal 40 further includes a second end 42 formed in an opposed relation to the first end 41 and welded to the cord 10.

Figure 4:
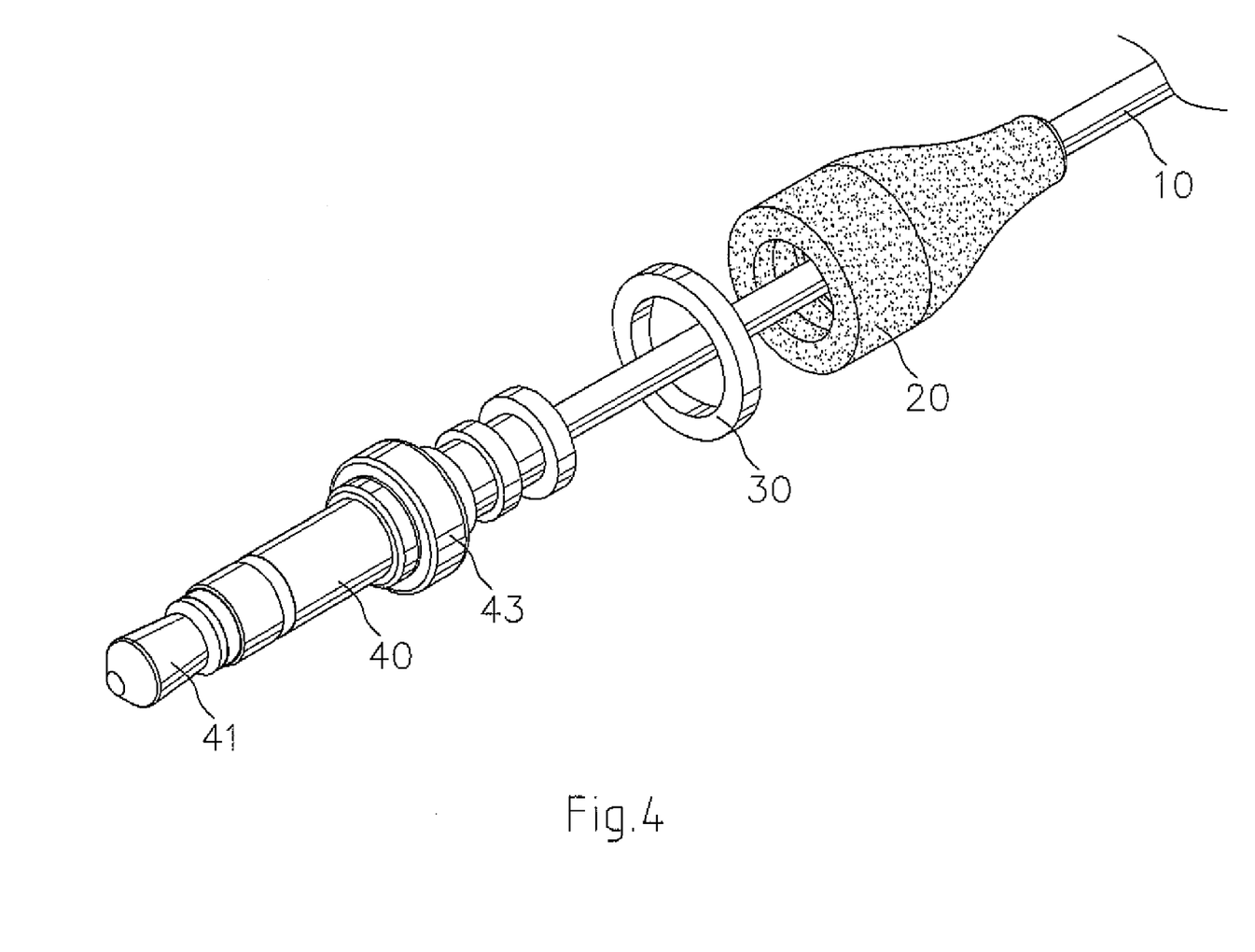
FIG. 4 illustrates the second step of making the audio plug of the present invention.

Referring to FIG. 4, a first molding 43 is circumferentially formed on a connection between the terminal 40 and the cord 10 and includes a stepped external peripheral surface. Preferably, the first molding 43 is formed using an injection molding process.

Figure 5:
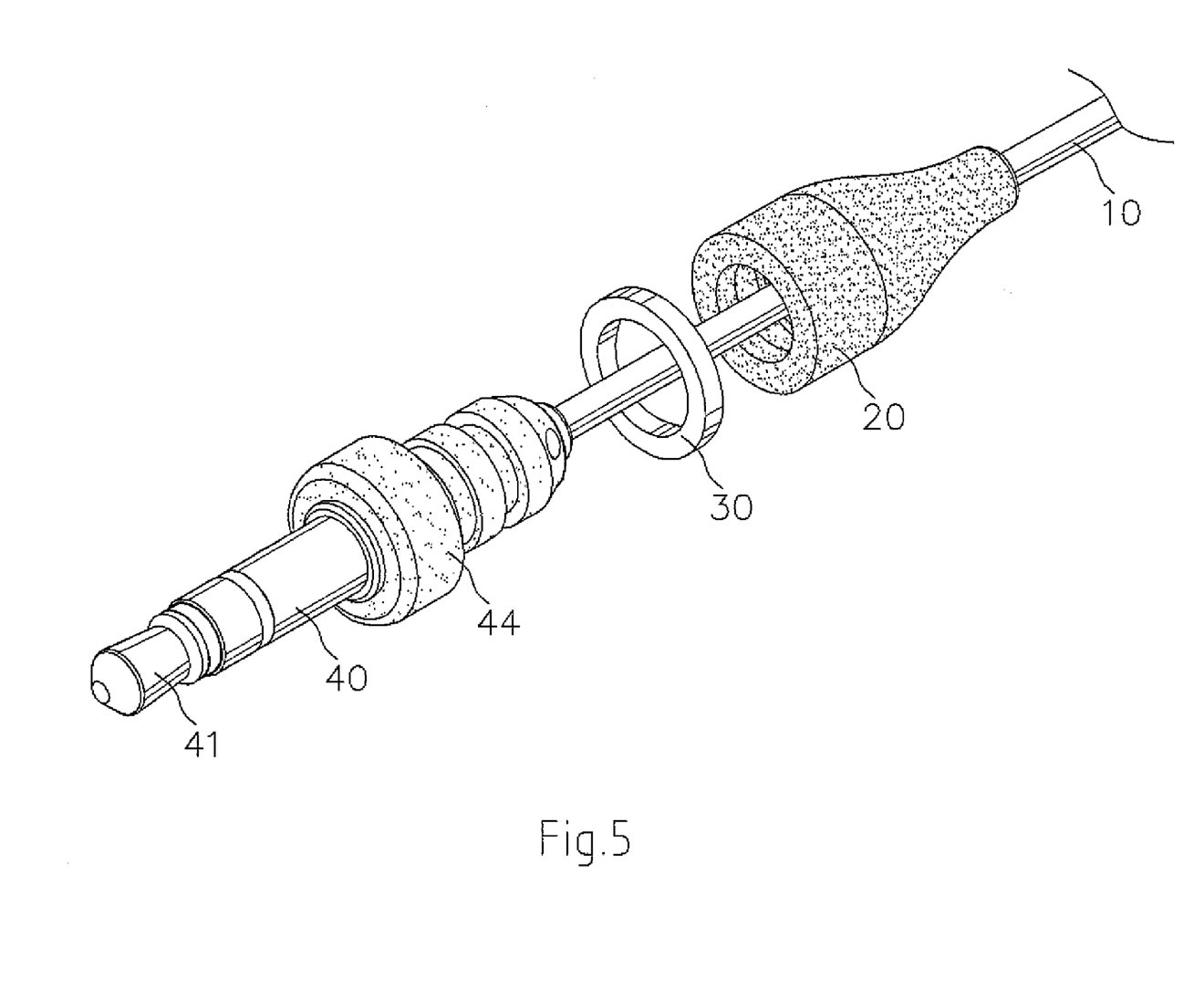
FIG. 5 illustrates the third step of making the audio plug of the present invention.

Referring to FIG. 5, a second molding 44 is formed on the external peripheral surface of the first molding 43 completely and includes a first end with a diameter and a stepped second end with each step having a diameter smaller than that of the first end. Preferably, the second molding 44 is formed using an injection molding process.

Figure 6:
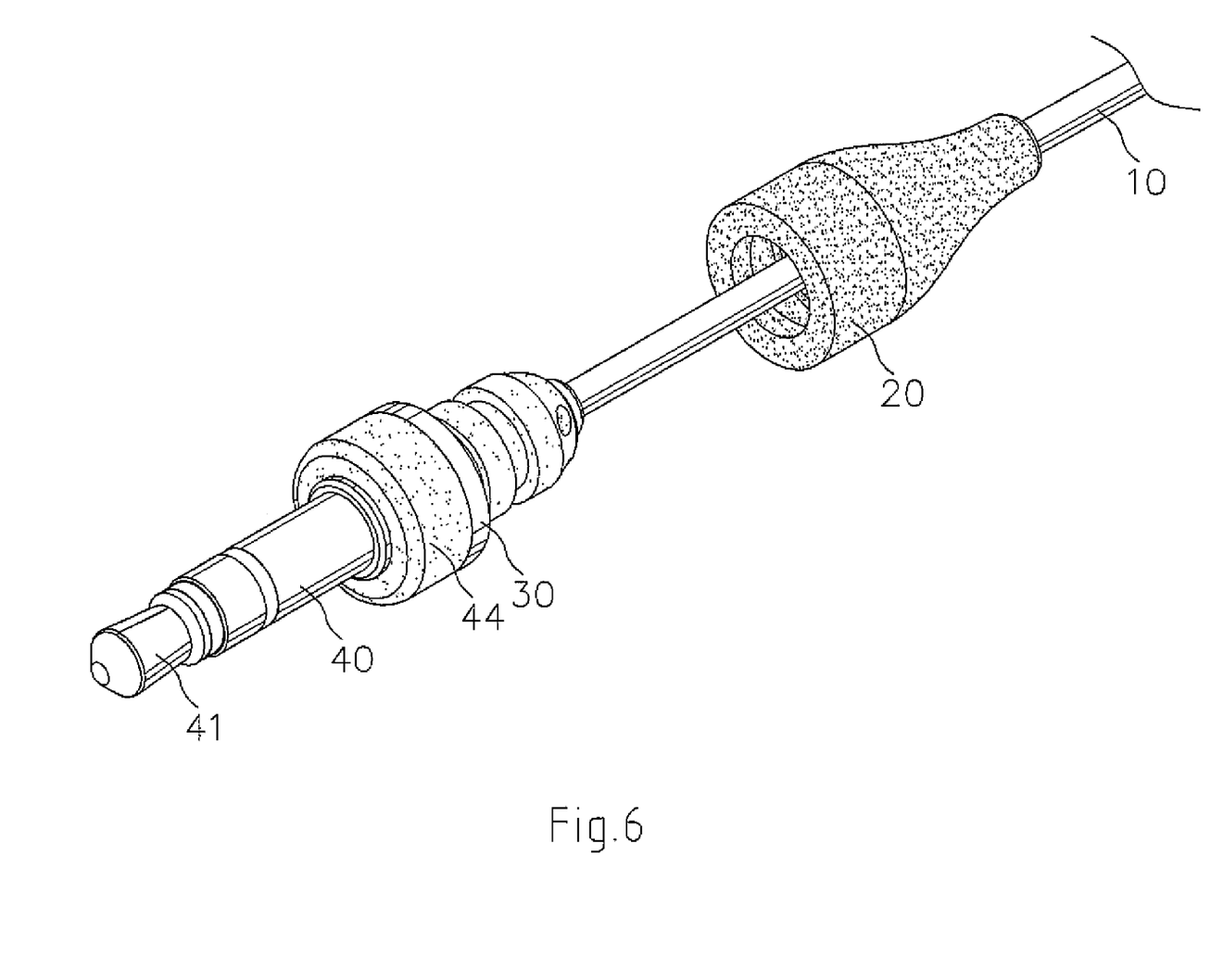
FIGS. 6 and 7 illustrate the fourth step of making the audio plug of the present invention.

Referring to FIG. 6, the ring 30 is disposed circumferentially on the second end of the second molding 44 and abuts against the first end thereof. In this embodiment, the ring 30 has an external peripheral surface flush with that of the first end of the second molding 44.

Figure 7:
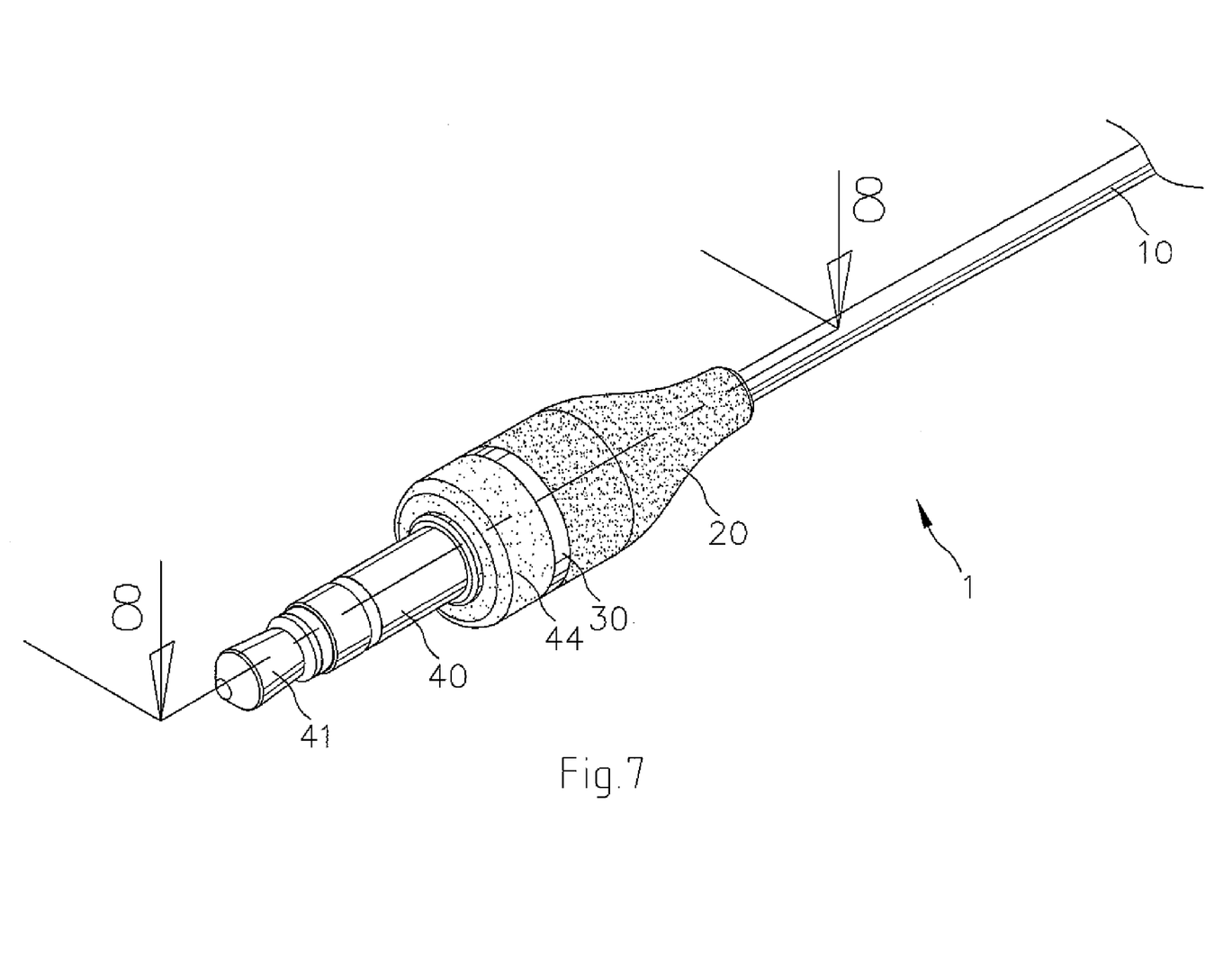
Figure 8:
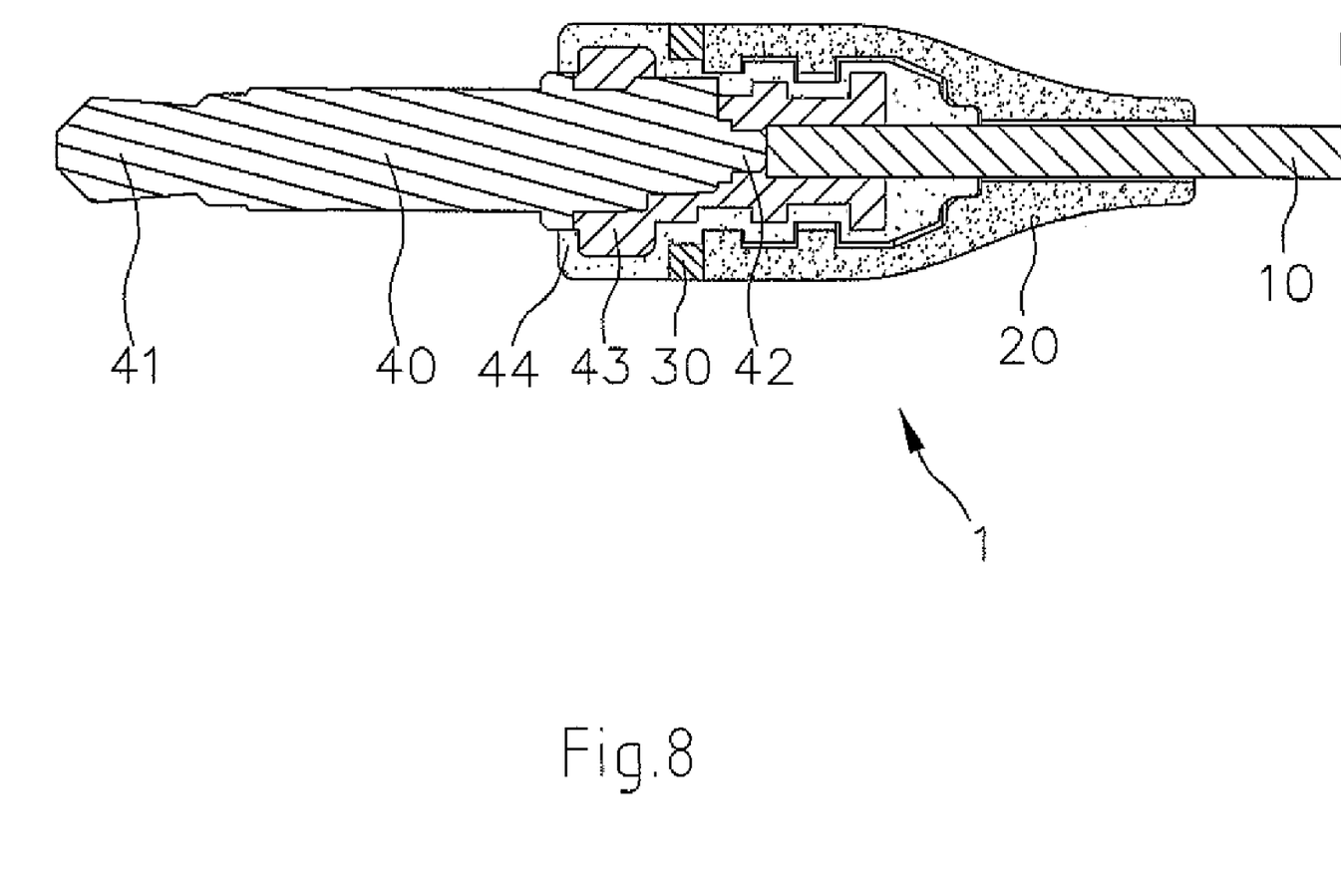
FIG. 8 is a cross-sectional view of the audio plug shown in FIG. 7.

As shown in FIGS. 7 and 8, the strain relief collar 20 is thereafter circumferentially attached to the second end of the second molding 44 and abuts with the ring 30 such that the ring 30 is prevented from movement. The strain relief collar 20 is securely mounted to the second molding 44, as the stepped second end of the second molding 44 tends to provide more frictional areas therebetween. Furthermore, the strain relief collar 20 includes an external peripheral surface which gradually tapers inwardly from a first end which engages with the second molding 44 toward a second end which surrounds the cord 10. Thus, the cord 10 is effectively prevented from losing connection with the terminal 40.

Figure 9:
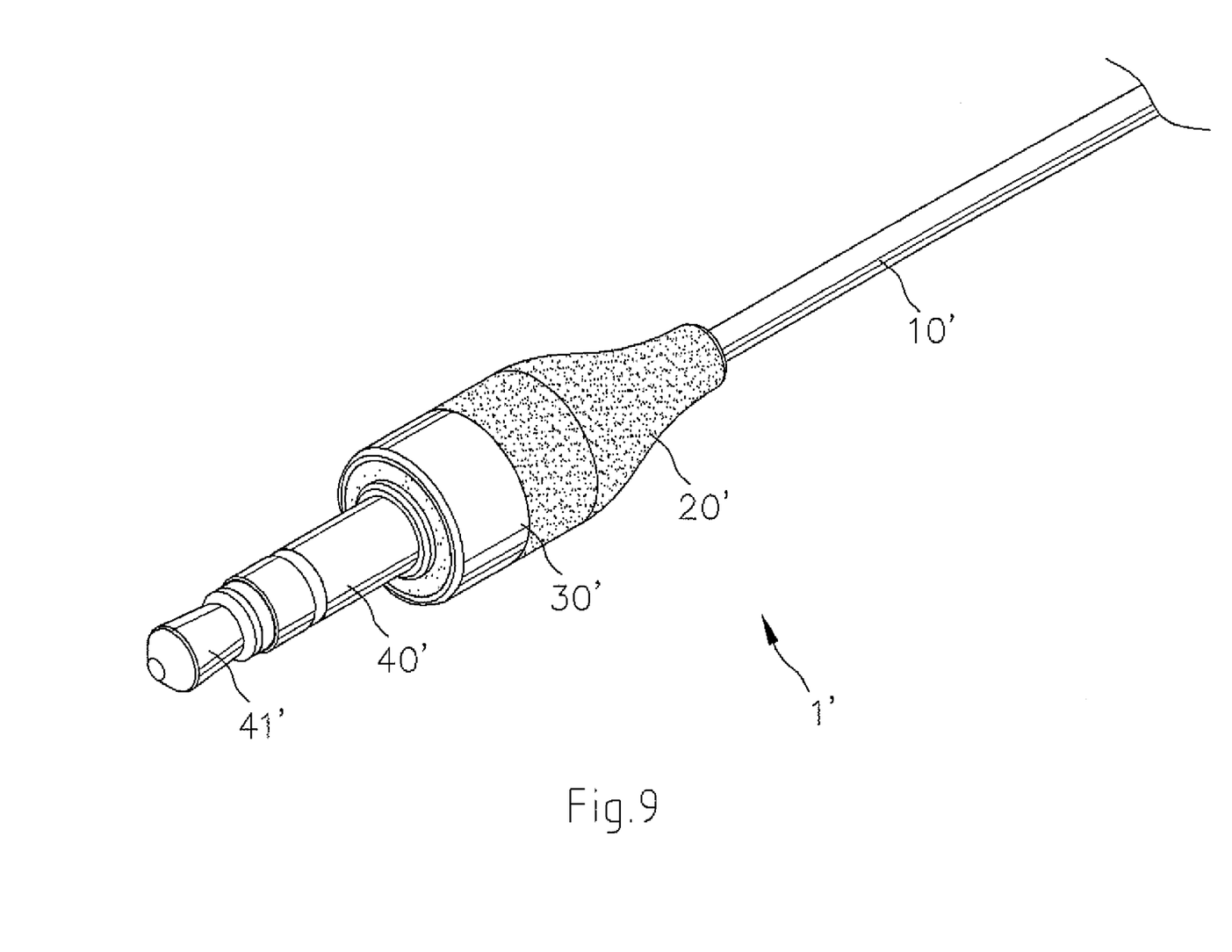
FIG. 9 is an alternate embodiment of an audio plug of the present invention.
Figure 10:
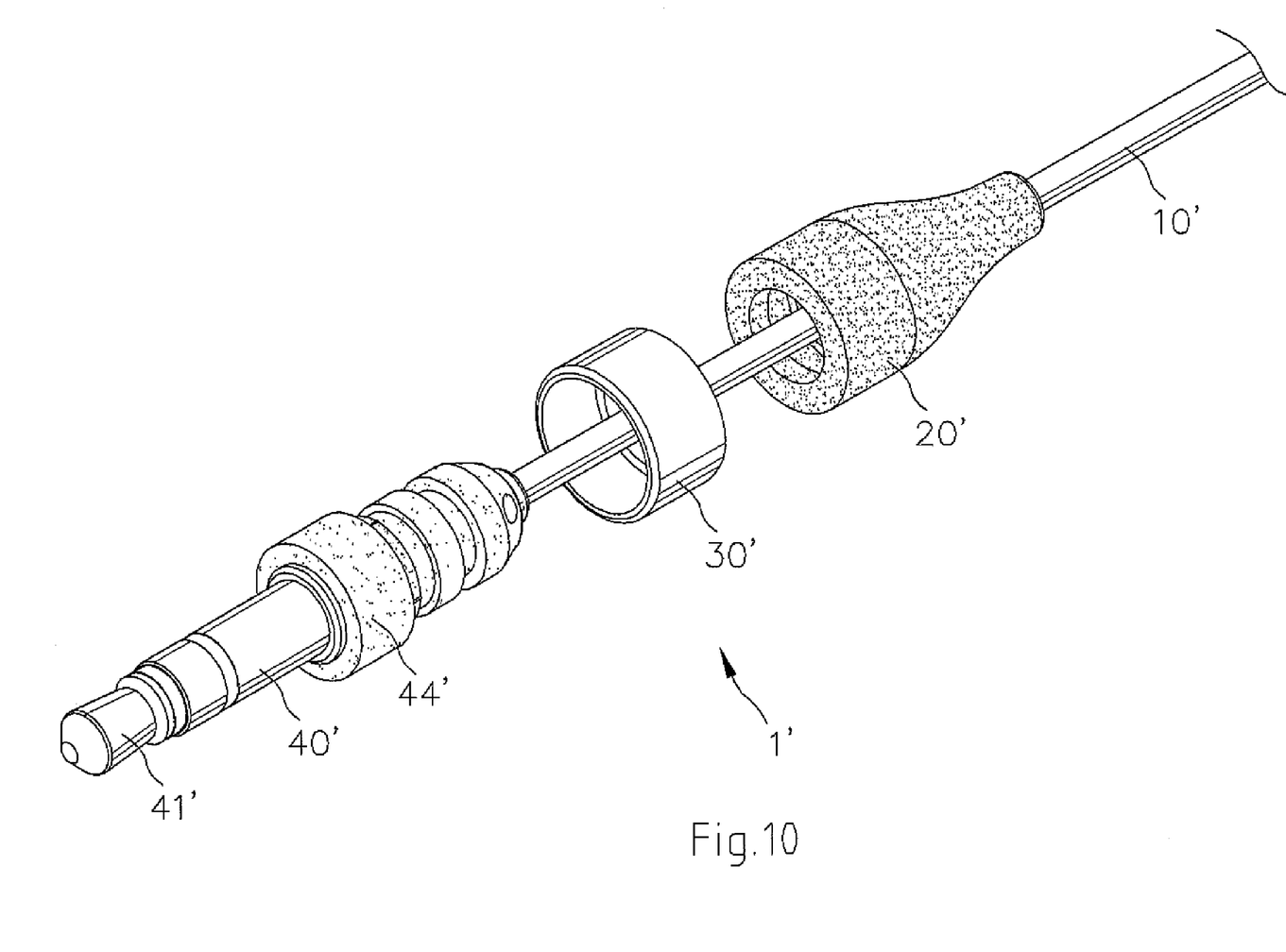
FIG. 10 is an exploded perspective view of the audio plug shown in FIG. 9.

FIGS. 9 and 10 show an alternate embodiment of an audio plug 1' of the present invention, wherein like numerals are employed to like component of the prior embodiment, however bearing the suffix. In this embodiment, the ring 30' has a depth that substantially equals to a depth of the first end of the second molding 44 which circumferentially receives the ring 30'.

In one aspect of the present invention, the ring 30 and 30' makes the corresponding audio plug 1 and 1' more aesthetically pleasing. In another aspect of the invention that the first and second moldings 43, 44 ensure that the audio plug 1 passes the electrostatic discharge (ESD) test.

Figure 1:
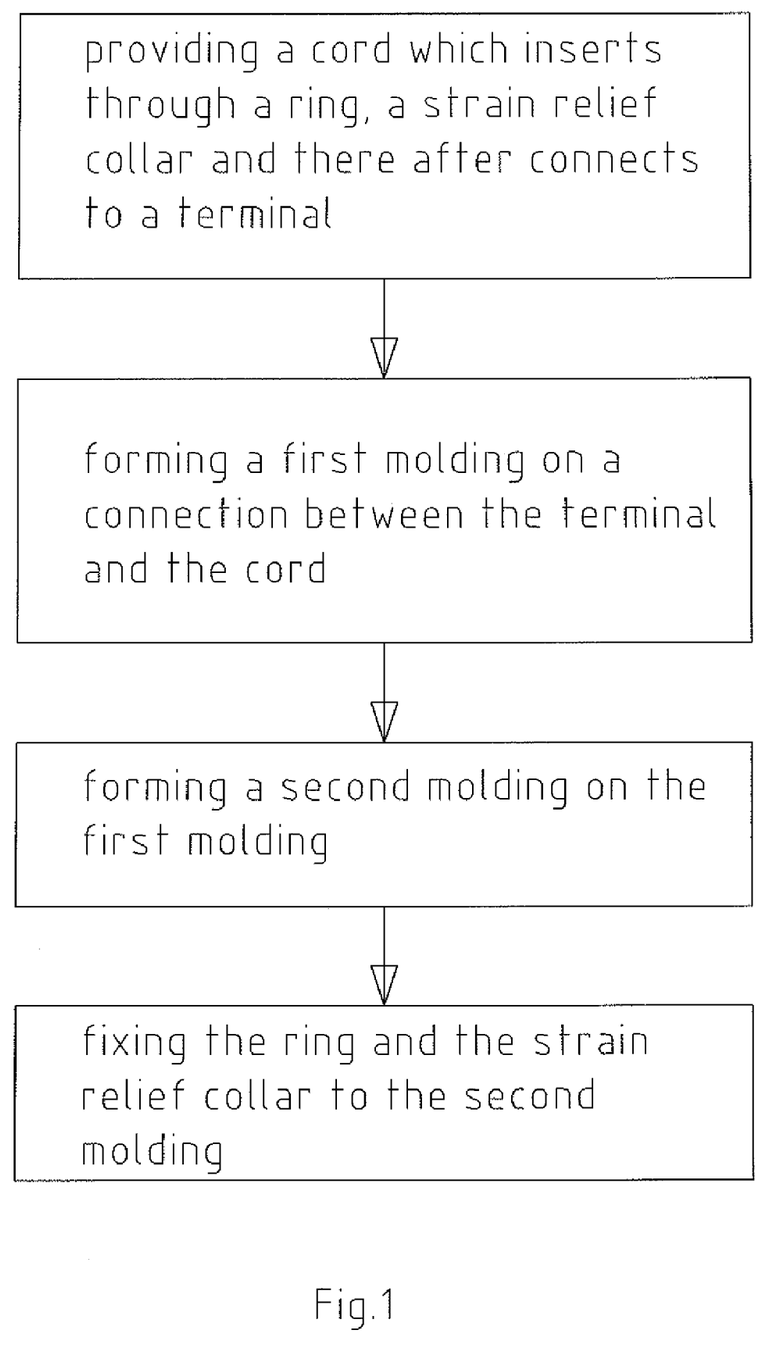
FIG. 1 is a flowchart showing steps for making an audio plug in accordance with the present invention.

Turning now to FIG. 1 of a flowchart of a method for making an audio plug 1, 1' of the present invention. A cord 10, 10' is first inserted through a ring 30, 30' and a strain relief collar 20, 20' successively and connected to a terminal 40 and 40'. Preferably, the ring 30 is made of metal. Preferably, the terminal 40 includes a first end 41 adapted to connect to an electrical product. A first molding 43 is then injection molded between the terminal 40 and the cord 10. The first molding 43 may then be peripherally surrounded by a second molding 44, which is formed using an injection molding process. The ring 30 and the strain relief collar 20 may then be received onto an external peripheral surface of the second molding 44 in a manner to restrain movement of the ring 30.

While the specific embodiments have been illustrated and described, numerous modifications come to mind without significantly departing from the spirit of invention and the scope of invention is only limited by the scope of accompanying claims.

What is claimed is:

1. A method for making an audio plug comprising:
   providing a cord to insert through a ring and a strain relief collar, so as to connect a terminal;
   forming a first molding between the terminal and the cord using an injection molding process;
   forming a second molding on an external peripheral surface of the first molding using an injection molding process; and
   fixing the ring and the strain relief collar onto an external peripheral surface of the second molding.

2. The method as claimed in claim 1, wherein the terminal comprises an end welded to the cord.

3. The method as claimed in claim 2, wherein the first molding encompasses a connection between the cord and the terminal.

4. The method as claimed in claim 1, wherein the second molding encompasses a connection between the cord and the first molding.

5. The method as claimed in claim 1, wherein the ring is made of metal.

6. An audio plug comprising;
   a cord;
   a terminal connected to the cord;
   a first molding circumferentially formed between the terminal and the cord;
   a second molding formed on an external peripheral surface of the first molding;
   a ring disposed on an external peripheral surface of the second molding; and
   a strain relief collar, circumferentially mounted on the second molding and enabling the cord to be inserted therein, abutted with the ring.

7. The audio plug as claimed in claim 6, wherein the terminal comprises an end connected to the cord using a welding process.

8. The audio plug as claimed in claim 6, wherein the second molding comprises a first end and a stepped second end with each step having a diameter smaller than that of the first end.

9. The audio plug as claimed in claim 8, wherein the ring and the strain relief collar are circumferentially mounted onto the second end of the second molding, and the ring is stably secured between the first end of the second molding and the strain relief collar.

10. The audio plug as claimed in claim 8, wherein the ring is circumferentially mounted onto the first end of the second molding, and the strain relief collar is circumferentially mounted onto the second end of the second molding.

11. The audio plug as claimed in claim 6, wherein the first molding comprises an external peripheral surface of a stepped configuration.

12. The audio plug as claimed in claim 6, wherein the strain relief collar comprises an external peripheral surface which gradually tapers inwardly from an end which engages with the second molding toward another end which surrounds the cord.

13. The audio plug as claimed in claim 6, wherein the ring is made of metal.

* * * * *